US006621806B1

(12) United States Patent
Keller et al.

(10) Patent No.: US 6,621,806 B1
(45) Date of Patent: Sep. 16, 2003

(54) TIMING DEVICE AND TIMING METHOD

(75) Inventors: Hans-Georg Keller, München (DE); David Sellar, München (DE)

(73) Assignee: Infineon Technologies AG, Munich (DE)

( * ) Notice: Subject to any disclaimer, the term of this patent is extended or adjusted under 35 U.S.C. 154(b) by 273 days.

(21) Appl. No.: 09/711,865

(22) Filed: Nov. 13, 2000

Related U.S. Application Data

(63) Continuation of application No. PCT/EP99/02857, filed on Apr. 27, 1999.

(30) Foreign Application Priority Data

May 11, 1998 (EP) .............................................. 98108535

(51) Int. Cl.$^7$ ............................. H04B 7/212; H04J 3/06; H04L 7/00
(52) U.S. Cl. ....................... 370/329; 370/347; 370/509; 375/354; 375/365
(58) Field of Search .................................. 370/329, 337, 370/347, 442, 458, 508, 509; 375/354, 365, 368, 373; 714/738, 814, 815

(56) References Cited

U.S. PATENT DOCUMENTS

| | | | | |
|---|---|---|---|---|
| 4,101,761 A | * | 7/1978 | Merryman | 377/39 |
| 4,414,676 A | * | 11/1983 | Kraul et al. | 375/368 |
| 4,553,100 A | | 11/1985 | Nishiura | |
| 4,719,593 A | | 1/1988 | Threewitt et al. | |
| 5,036,494 A | * | 7/1991 | Wise et al. | 365/230 |
| 5,040,234 A | * | 8/1991 | Yamamoto et al. | 388/811 |
| 5,313,622 A | * | 5/1994 | Truchard et al. | 714/814 |
| 5,444,743 A | * | 8/1995 | Scarpa | 375/368 |
| 5,461,310 A | | 10/1995 | Cheung et al. | |
| 5,594,737 A | | 1/1997 | Pillekamp | |
| 5,670,964 A | | 9/1997 | Dent | |
| 5,673,275 A | | 9/1997 | Garcia | |
| 5,719,906 A | * | 2/1998 | Kayada | 375/354 |
| 5,809,091 A | * | 9/1998 | Barrow | 375/354 |
| 6,101,229 A | * | 8/2000 | Glover | 375/354 |

FOREIGN PATENT DOCUMENTS

| | | |
|---|---|---|
| EP | 0 076 129 A2 | 4/1983 |
| EP | 0 401 763 A2 | 12/1990 |
| EP | 0 678 992 A2 | 10/1995 |
| GB | 2 245 727 A | 1/1992 |

OTHER PUBLICATIONS

International Publication WO 96/16522 (Suonvieri), dated May 30, 1996.
International Publication WO 97/47097 (Barrow), dated Dec. 11, 1997.
International Publication WO 98/13949 (Erben et al.), dated Apr. 2, 1998.

* cited by examiner

*Primary Examiner*—Huy D. Vo
*Assistant Examiner*—M. Phan
(74) *Attorney, Agent, or Firm*—Laurence A. Greenberg; Werner H. Stemer; Ralph E. Locher

(57) ABSTRACT

A timing device for generating and outputting a plurality of signal edges by changing signal statuses at predeterminable times. The timing device includes a cyclically addressable memory in which a plurality of time events are stored. Each time event is assigned a time value, which corresponds to a predetermined time, and a plurality of predetermined signal statuses. The timing device further includes a comparator, which compares the current count of a counter to the time value of a time event, which has just been acquired from memory. Given a match, the next time event is read from the memory. The timing device also includes an output device which outputs the predetermined signal statuses. With the timing device it is possible to freely program periodically recurring time indications by allocating memory accordingly.

11 Claims, 6 Drawing Sheets

RAM content

← Timing Compare Value, 15 bits → | TRIG (0) | TRIG (1) | TRIG (2) | TRIG (3)

| | | | | | | | | | | | | | | | | TRIG(0) | TRIG(1) | TRIG(2) | TRIG(3) |
|---|---|---|---|---|---|---|---|---|---|---|---|---|---|---|---|---|---|---|---|
| TE0 | 0 | 0 | 0 | 0 | 0 | 0 | 0 | 0 | 0 | 0 | 0 | 0 | 0 | 0 | 0 | 0 | 0 | 0 | 0 |
| TE1 | 0 | 0 | 0 | 0 | 0 | 1 | 1 | 1 | 0 | 0 | 0 | 1 | 0 | 0 | 1 | 1 | 0 |
| TE2 | 0 | 0 | 0 | 0 | 0 | 1 | 0 | 0 | 0 | 1 | 0 | 0 | 1 | 1 | 0 | 1 | 1 | 1 | 1 |
| TE3 | 0 | 0 | 0 | 0 | 1 | 1 | 0 | 0 | 0 | 0 | 1 | 1 | 1 | 0 | 0 | 1 | 1 | 0 |
| TE4 | 0 | 0 | 0 | 0 | 1 | 1 | 0 | 0 | 1 | 1 | 1 | 0 | 0 | 1 | 0 | 0 | 0 | 0 | 0 |

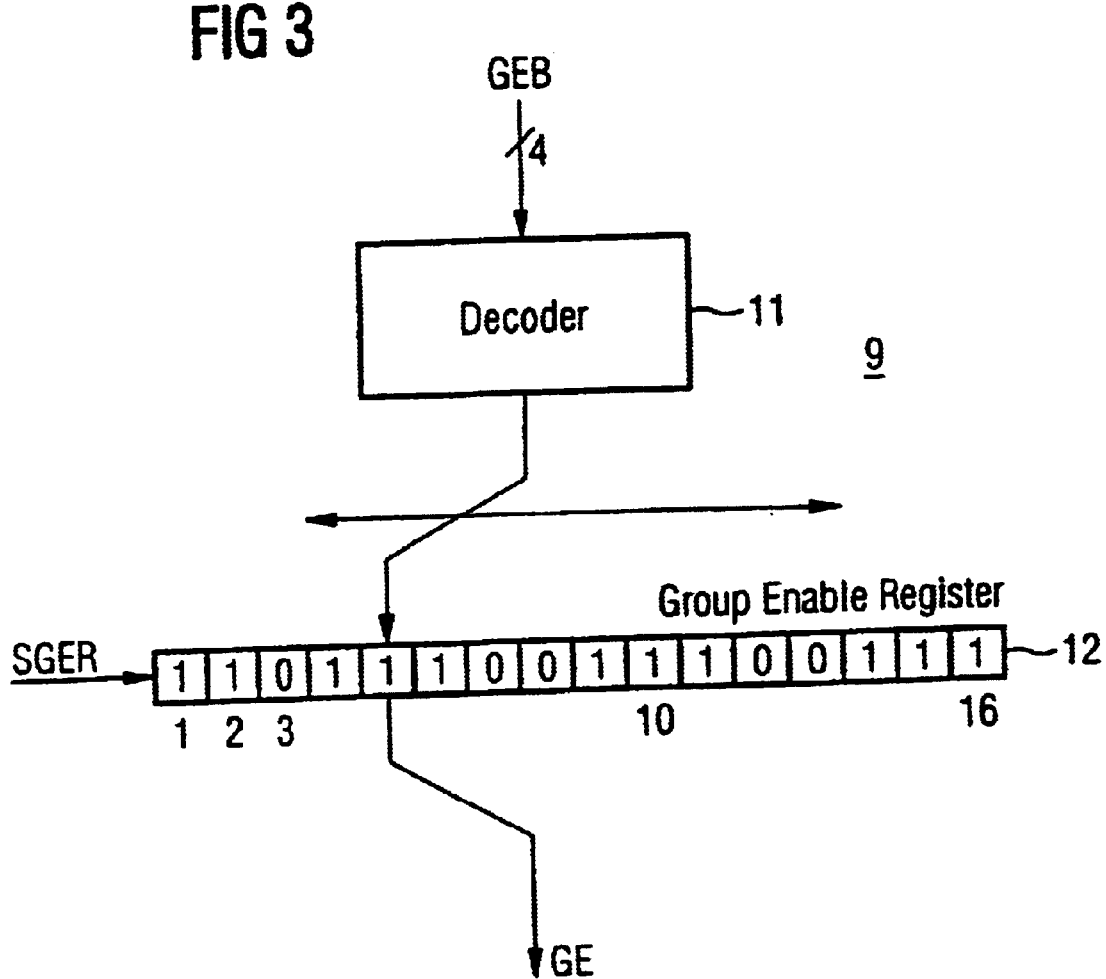

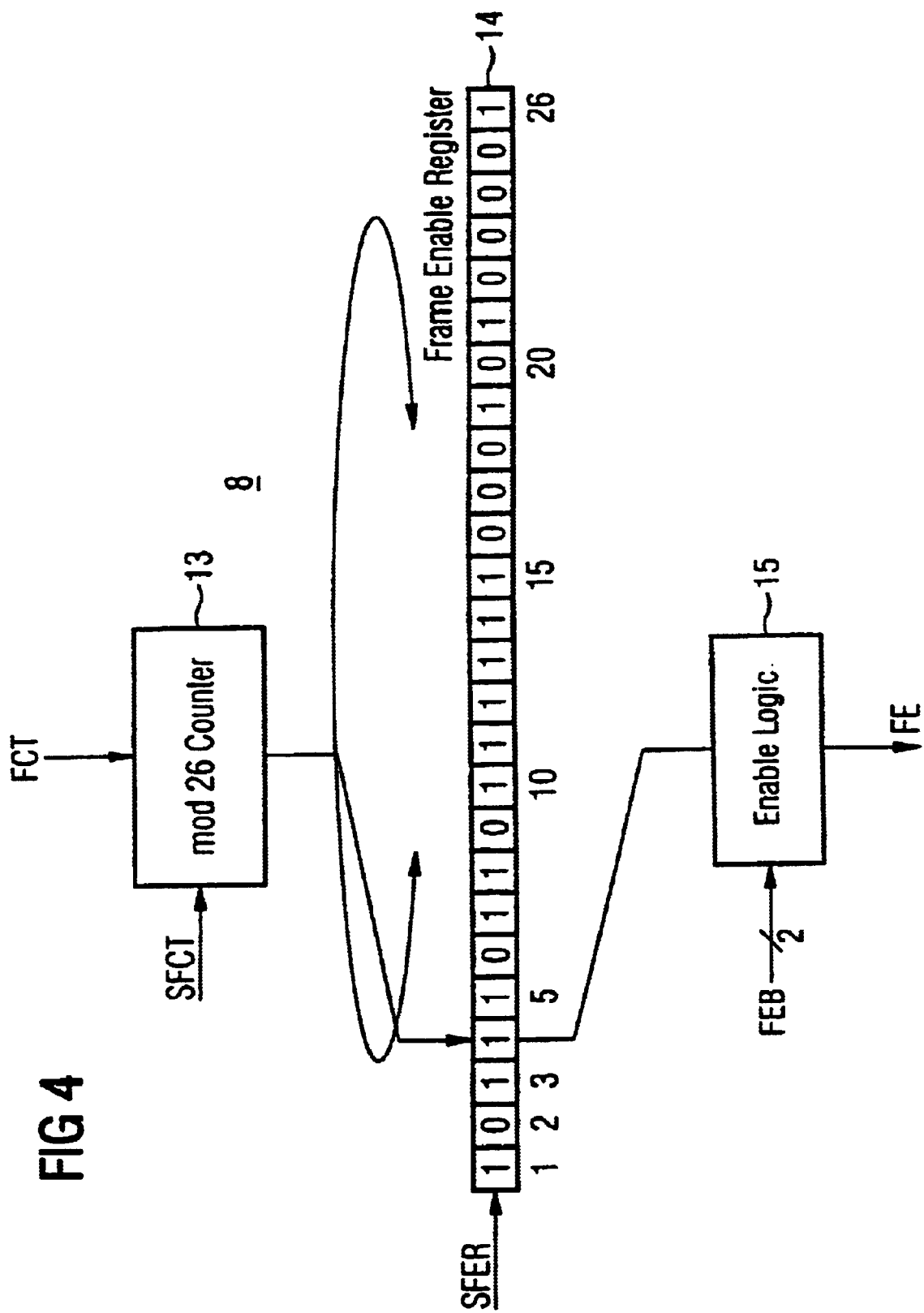

TIMING DEVICE AND TIMING METHOD

CROSS-REFERENCE TO RELATED APPLICATION

This is a continuation of copending International Application PCT/EP99/02857, filed Apr. 27, 1999, which designated the United States.

BACKGROUND OF THE INVENTION

FIELD OF THE INVENTION

The invention relates to a timing device and a timing method as well as to an application of the timing device.

U.S. Pat. No. 5,594,737 teaches a configuration for controlling a transceiver of a base station and/or mobile units of a mobile radio system. A processor is provided therein which is equipped with a timer, i.e. a counter, and with the aid of which controls other elements of the system such as the transceiver. This type of control is necessary in mobile radio systems based on TDMA, because the mobile unit transmits in one time slot and receives in another in alternation. The time sequence and duration of the transmission and reception time periods are stipulated in the respective mobile radio standard, e.g. GSM or DECT. The time points or periods can vary within defined limits over the duration of a communication.

Among other things, the control processor in U.S. Pat. No. 5,594,737 generates timing signals for the other circuit parts so that these can be activated and deactivated at the required times. A typical example of this is the antenna switch, which connects the antenna to the reception path or the transmission path as required. Whereas U.S. Pat. No. 5,594,737 demonstrates a configuration that can be used for the DECT mobile radio standard in particular, WO 98/13949 demonstrates a similar structure to that of the invention that can be used for the GSM mobile radio standard in particular. The logic and control block LSB therein takes over the function, among others, of switching the circuit parts of a TDMA reception device in and out as required.

FIG. 5 shows the essential elements of the timing device which is used in a module of the applicant, which is available under the model number PMB 2800. According to FIG. 5, the instantaneous count of a TDMA clock counter that is 15 bits wide is delivered to a plurality of comparison units COMPARE 1, COMPARE 2, . . . . The TDMA clock counter is controlled by a cycle with a frequency of 2.166 MHz. Each TDMA comparison unit compares the instantaneous count of the TDMA clock counter to a set value, e.g. SET 1, and a reset value, e.g. RST 1. When the instantaneous count of the TDMA clock counter matches the set value, the comparison unit sets its appertaining output signal, e.g. S1. The output signal remains set until the TDMA clock counter attains the reset value—i.e., the instantaneous counter status matches the reset value—whereupon the comparison unit resets the output signal. The set value and the reset value for each of the output signals S1, S2, . . . are deposited in respective registers SET1 and RST1, whose contents are defined by a control device $\mu C$.

With the aid of a circuit as represented in FIG. 5, it is possible to generate signal characteristics as represented in FIG. 6. For instance, the signal S1 is active in the region of the reception slot 0, whereas the output signals S9 and S10 are active in the region of the transmission slot 3. Other signals serve to actuate circuit parts which relate to the transmission and reception or to the monitoring of a monitor channel in the time slot 5. The time position of the TDMA frames and the allocation of transmission, reception and monitoring time slots are defined by the base station of the mobile radio system. The mobile unit—in which the module PMB 2800 is preferably employed—has to adapt the time indications that are required for transmission, reception or monitoring to the specifications of the base station and to the situation of the radio transmission path at the moment. The time indications that are provided for the mobile part must be adjusted relative to the TDMA frame depending on whether the mobile unit is moving away from the base station or toward it, in order to compensate shorter or longer radio communication transit times, accordingly. This is represented in FIG. 6 by corresponding black blocks in the individual signals, which represent the permitted time window for a signal change. Similarly, the time indications must be adapted to the requirements of a respective circuit environment (in the context of a chip set). The control unit $\mu C$ that is represented in FIG. 5 can set the required signal change times by programming the set and reset registers accordingly.

A disadvantage of the previous configuration is that for each of the signals S1, S2 . . . S10 in FIG. 6 precisely one comparison unit COMPARE 1, COMPARE 2, . . . must be provided, which generates the respective signal at its output. If the module that contains this circuit is used in an environment that requires a higher number of time signaling operations, the module cannot provide them. Furthermore, the time indications of different signals are partly dependent on one another. This is either accounted for by a fixed wiring between the set and reset inputs at the comparison units, or alternatively the control unit $\mu C$ programs the set and reset registers in a corresponding manner. But a fixed wiring suffers from a lack of flexibility of the signal generation process. The alternative procedure consumes computing power of the control unit $\mu C$, which should be loaded as little as possible by the reprogramming of the set and reset registers, since it must manage several other tasks in its circuit environment. Current requirements of the aforementioned mobile radio standards, particularly GSM (see e.g. ETSI prETS 300 908, November 96 for multislot applications) require a far greater number of timing signals than hitherto, which must be mutually adjustable in a flexible manner.

SUMMARY OF THE INVENTION

It is accordingly an object of the invention to provide a timing device and a timing method which overcomes the above-mentioned disadvantageous of the prior art devices and methods of this general type such that a plurality of timing signals can be generated in a flexible fashion.

With the foregoing and other objects in view there is provided, in accordance with the invention a timing device for generating and outputting a plurality of signal edges by changing signal statuses at predeterminable times. It includes a cyclically addressed memory in which a plurality of time events are stored. Each time event is assigned a time value and a plurality of signal statuses. The time value corresponds to a predetermined time point. The timing device further includes a comparator that compares the instantaneous count of a counter to the time value, which has just been read from the memory, of a time event, and which reads the next time event from the memory given a match. The timing device also includes an output device, which outputs the predetermined signal statuses. It is thus possible to flexibly generate a plurality of timing signals by allocating memory accordingly. The number of time events and the number of timing signals per time event can be designed with complete flexibility, limited only by the available storage space. Furthermore, it is also possible to effortlessly achieve more than one set and reset process per count cycle for a timing signal, because this can also be accomplished by a simple allocation of memory. In particular, simultaneous time indications can be achieved on different timing signals by the corresponding allocation of memory, and need not be generated by a hard-wired logical connection between the timing signals as was done previously.

In accordance with an added feature of the invention, the timing device includes a time shift mechanism, which is connected in series with the comparator. The time shift mechanism adds a time shift value to the time value that is read from the memory. The result of the addition is then fed to the comparator. To this end, the time shift mechanism preferably includes a register in which the time shift value is stored. The time shift value can assume both positive and negative values. As long as a value other than zero is stored in the register of the time shift mechanism, the time indications that are generated therefrom either precede or follow the time values that are programmed in the memory, depending on whether a positive or negative time shift value has been stored. This is advantageous particularly when the time values of a large number of time events must be shifted by a defined value. This is the case, for example, when a mobile part moves away from the base station, and the transmission time of the mobile part must be moved slightly ahead so that the transmission signal of the mobile part that arrives at the base station falls precisely in the reception slot of the base station. In this case, all time values that belong to the transmission time slot must be pushed forward accordingly. This can be accomplished without a problem by programming the register in the time shift mechanism accordingly.

In accordance with an additional feature of the invention, each time event includes a group code. It is thus possible to assign each memory entry to a particular group. With a corresponding evaluation logic, groups of time indications within the plurality of timing signals can be gated in and out as needed. The gating of time indications in and out is preferably accomplished by programming a group enable register.

In accordance with another feature of the invention, each time event includes a frame code. This is particularly advantageous in mobile radio systems that operate according to the GSM standard, in which specific frame sequences are provided with a period duration of 26 TDMA frames. With the frame code it is possible to gate a selection of time indications from the plurality of timing signals in and out in dependence upon the frame within the cycle of 26 TDMA frames that is presently being passed through. The programming is preferably accomplished via a frame enable register whose contents are logically linked to the frame code of a memory entry.

With the foregoing and other objects in view there is provided, in accordance with the invention a method for generating a plurality of signal edges at predeterminable times that includes a first step of storing a plurality of time events in a predetermined order. Each time event has a time value and a plurality of signal statuses. This is followed by the reading of a time event from the memory and comparing the time value acquired in the time event to the instantaneous count of a counter. When the time value that has just been read matches the instantaneous count of the counter, the next time event is read from memory. The plurality of signal statuses of a time event is thereby outputted. Signal edges arise consequent to the alternation of a signal status from a first status to a second status or vice versa.

In accordance with another mode of the invention, prior to the comparison step an adding step is executed, in which a time shift value is added to the time value that has just been read out.

In accordance with a concomitant feature of the invention, this type of device or method can advantageously be used in any TDMA communication system in which time indications must be controlled flexibly and precisely. This relates in particular to mobile radio systems in which recurring time indications must be generated (e.g. UMTS, Universal Mobile Telephone). The invention can be used particularly expediently in mobile radio systems based on TDMA (particularly DECT and GSM). Particular advantages arise when the invention is employed in a mobile part.

Other features which are considered as characteristic for the invention are set forth in the appended claims.

Although the invention is illustrated and described herein as embodied in a timing device and timing method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2a shows an example of a section of the contents of the memory shown in FIG. 1;

FIG. 2b shows signal curves of timing signals pertaining to FIG. 2a;

FIG. 3 shows an exemplary embodiment of an inventive group enable device;

FIG. 4 shows an exemplary embodiment of an inventive frame enable device;

DESCRIPTION OF THE PREFERRED EMBODIMENTS

Figure 1:
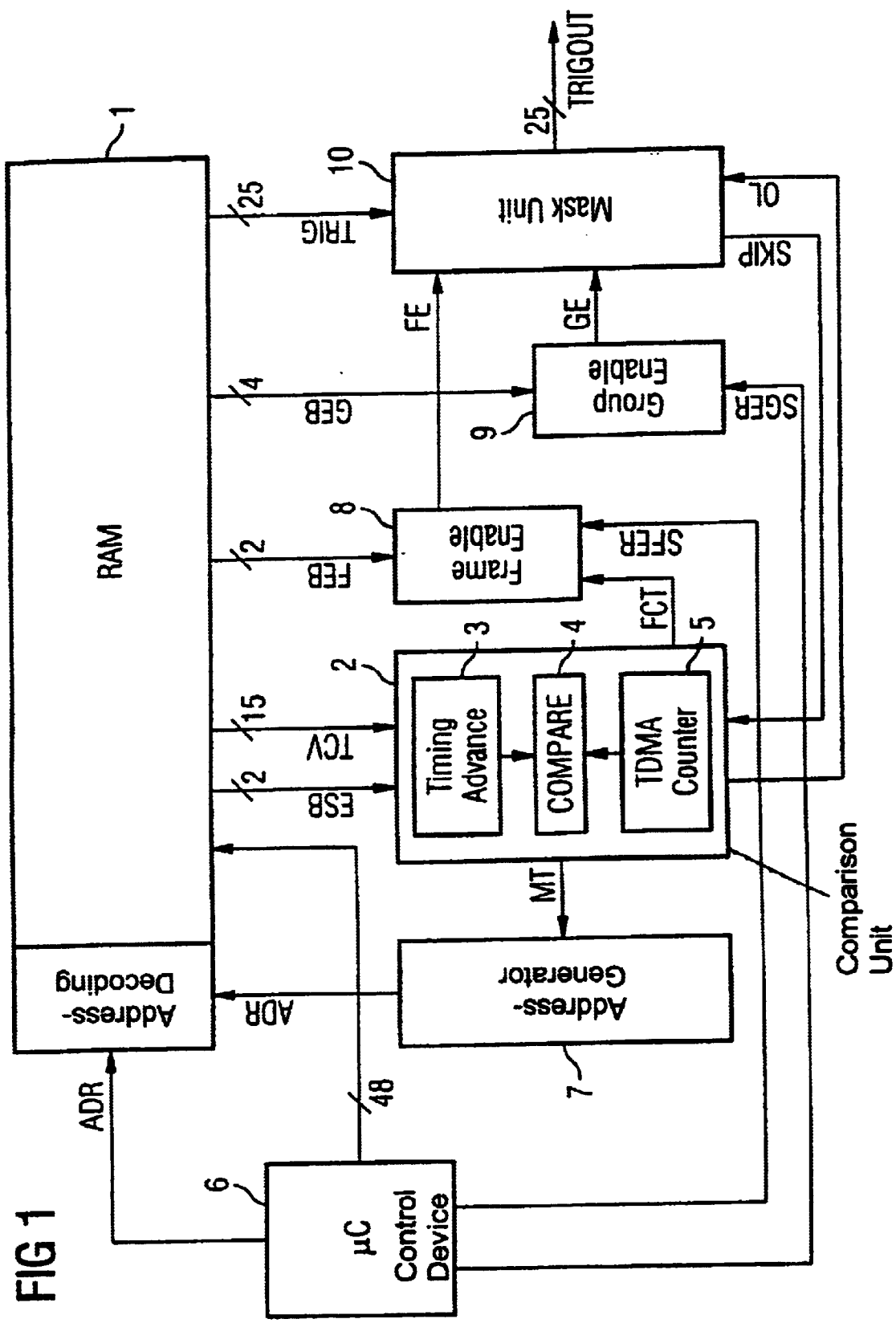
FIG. 1 shows an exemplary embodiment of a timing device according to the invention.

Referring now to the figures of the drawing in detail and first, particularly, to FIG. 1 thereof, there is shown an exemplary embodiment of a timing device according to the invention. It shows a memory 1 in the form of a RAM (Random Access Memory), which has an address decoding process at its disposal. Memory 1 corresponds in its structure to an off-the-shelf RAM. This timing device includes a comparison unit 2, which is connected via data bus lines TCV (Timing Compare Value) and ESB (Entry Select Bit) to a part of the data output terminals of the memory 1. The data bus TCV has a bit width of 15 bits, and the data bus ESB has a bit width of 2 bits. The comparison unit 2 is connected to an address generator 7 via a signal line MT (Match Timer) in order to prompt the address generator to generate a new address. In turn, the address generator 7 is connected to the address inputs of the memory 1 via the address bus line ADR.

The comparison unit 2 includes a counter 5, a comparison logic 4, and a time shift device 3. The counter 5 (TDMA counter) is a mod$1000_D$ counter that cycles with a frequency of 2.166 MHz. i.e., after 10,000 clock pulses the counter is reset in order to count to the decimal value 10,000 again. Given a clock frequency of 2.166 MHz, the revolution time of the counter corresponds precisely to the frame duration of 4.615 ms of a TDMA frame having 8 time slots of a GSM mobile radio system. The binary representation of the status of the counter 5 is delivered to the comparison logic 4. The comparison logic 4 compares this counter status to the output value of the time shift device 3. When the binary status of the counter 5 and the output value of the time shift device 3 match, the comparison logic 4 sends a signal to the address generator 7, which subsequently addresses a new address in the memory 1.

The time shift device 3 includes a register in which a time shift value is stored. The contents of the register are applied to an adder, which adds the time shift value to the binary value of the bus line TCV. When a time shift value of zero is stored in the register, the binary value of the bus line TCV is handed through to the comparison logic 4. The time shift register is programmed via the data bus TCV when this is signaled on the data bus ESB. In an alternative exemplary embodiment, the time shift register in the time shift device may be programmed by a special control device.

The timing signals can be tapped at the output of the memory 1 at data bus lines TRIG with a bus width of 25 bits. They are outputted via a gating device 10 at a data bus TRIGOUT with a bus width of 25 bits. The comparison unit 2 indicates to the gating unit by a signal OL (output latch) to output the present data bus signals TRIG at the output TRIGOUT.

Figures 2A, 2B:
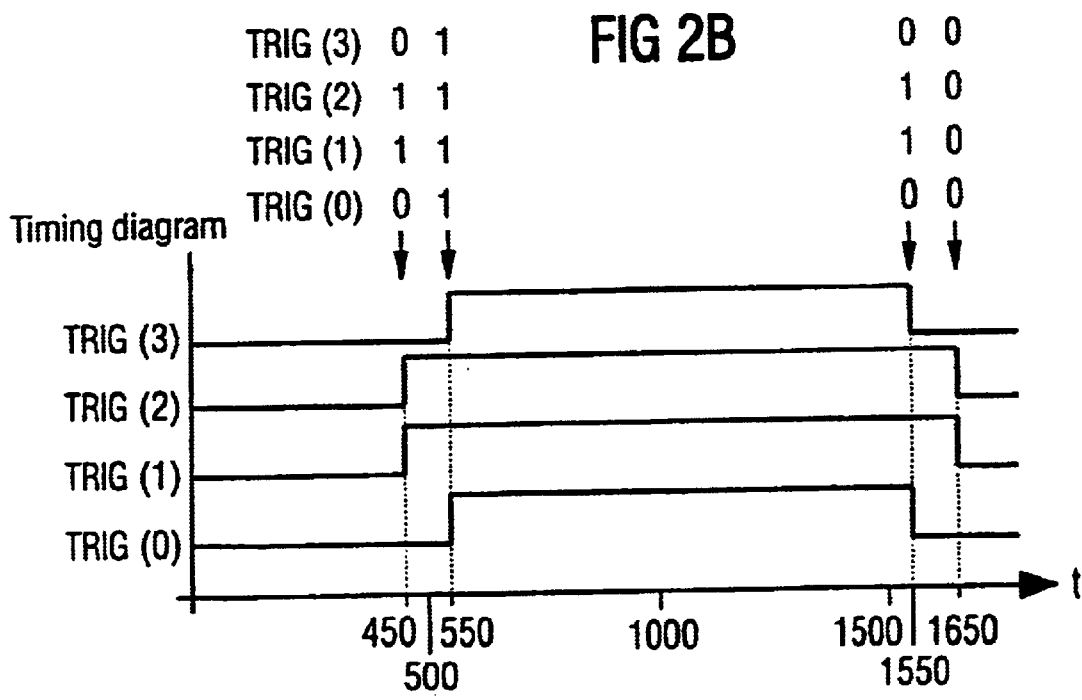
Figure 5:
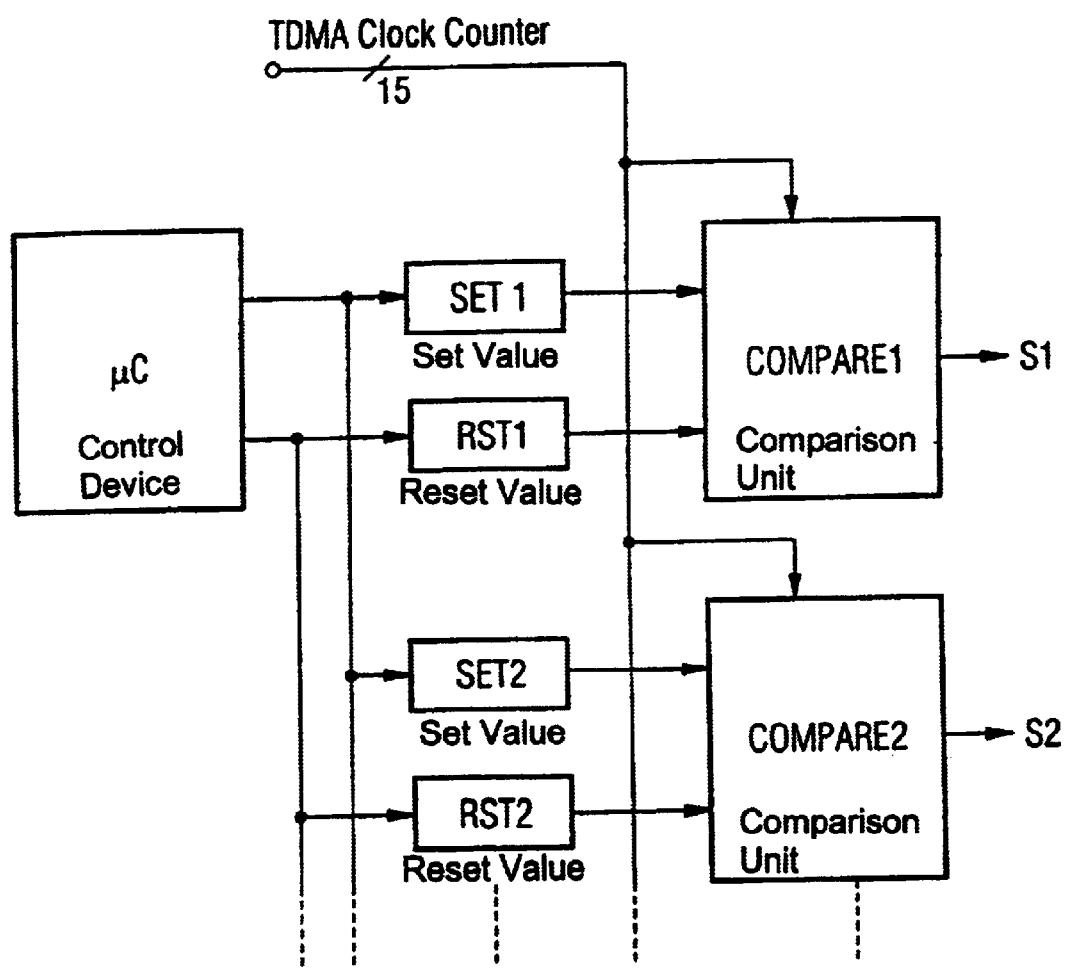
FIG. 5 shows the basic structure of a prior art timing device.
Figure 6:
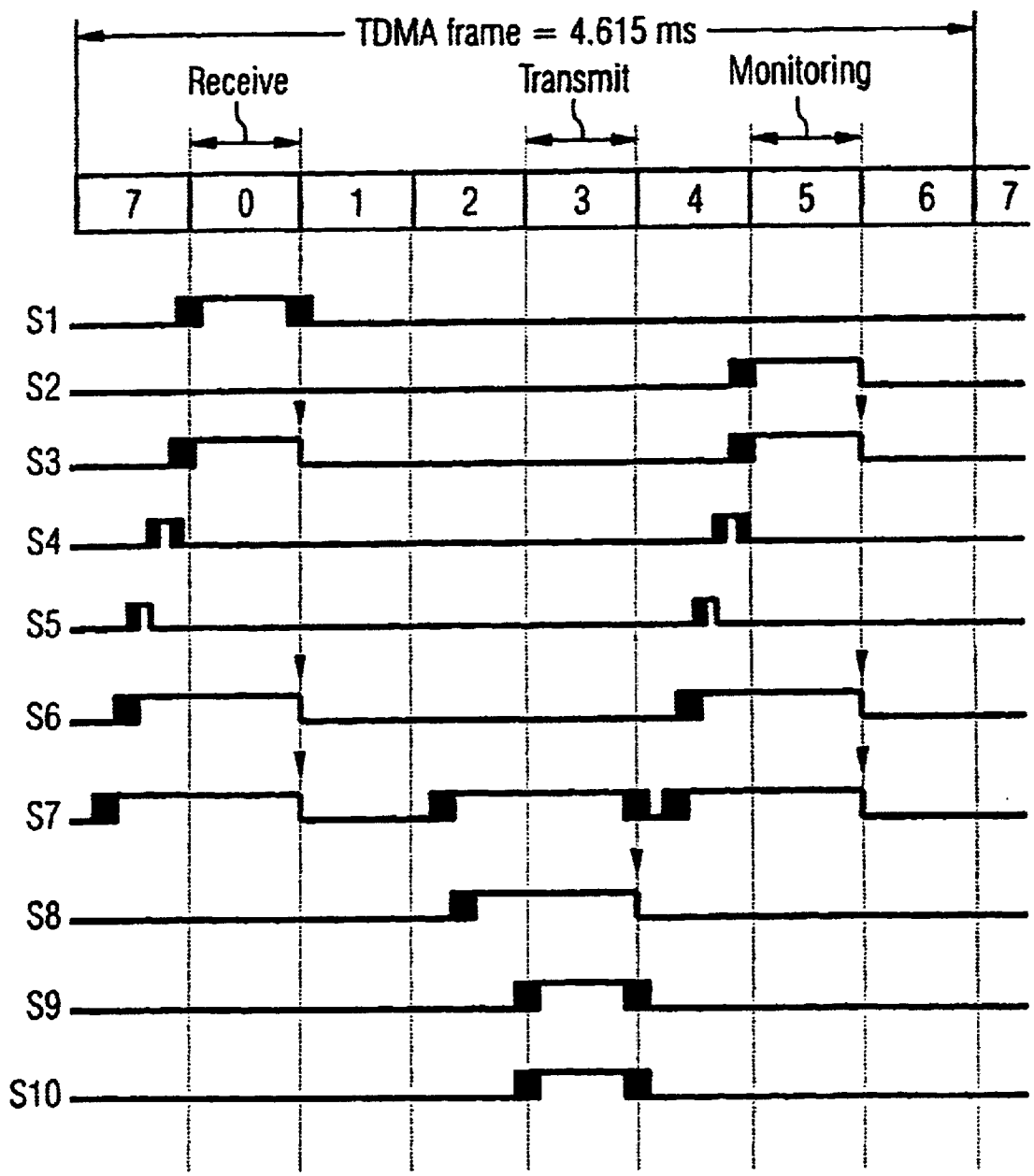
FIG. 6 shows timing signals such that can be generated using a structure as represented in FIG. 5.

The basic functioning of the timing device is laid open with the aid of an exemplary section of a memory allocation as represented in FIG. 2a. FIG. 2a shows a section of the memory 1 having 5 entries, which are referenced TE0, TE1, ... TE4 and which can be addressed in the memory in this way. Each entry in the memory 1 has a time value with a width of 15 bits, which can be read out via the data bus TCV, and a plurality of signal statuses, which can be tapped at the data bus TRIG.

The time diagram of FIG. 2b shows the curve of the signal statuses as they are programmed in FIG. 2a and outputted by the inventive device. A time shift value of zero is presumed. At time $0_D$ the signal statuses TRIG (0) to TRIG (3) are at the signal level 0. The signal statuses TRIG (0) to TRIG (3) are held at this value by a buffer storage device while the next time event TE1 is addressed in the memory. Next, the instantaneous count of the counter is compared to the time value of TE1. When the instantaneous count of the counter reaches the value $450_D$ as shown in FIGS. 2a and 2b, the signal statuses belonging to the time event TE1 are switched through to the output and held there. In the given example, the signal statuses TRIG (1) and TRIG (2) respectively change from 0 to 1, while the signal statuses TRIG (0) and TRIG (3) remain at 0. When the counter status matches the time value TE1, the addressing of the memory is also incremented one position to the time event TE2, while the signal statuses of the time event TE1 are held at the output. The signal statuses TRIG (0) to TRIG (3) remain unchanged until the time value of TE2 is attained. As soon as the counter status attains the value $550_D$, the signal statuses of the time event TE2 are switched through to the output. Accordingly, at this time the signal statuses TRIG (0) and TRIG (3) also change from 0 to 1 and are held there. At the same time, the device switches to the next time event TE3.

The time events stored in memory are processed in succession in this manner. When the last time event is reached, the device switches to the first time event stored in the memory, so that the memory is read out cyclically.

The memory 1 is programmed via a control device 6, which is connected to the memory 1 via an address line ADR and a data bus line. In the given exemplary embodiment, the data bus includes a total width of 48 bits. Among other things, the data bus contains data bus TCV with a width of 15 bits and the signal statuses TRIG that are to be outputted, which have a width of 25 bits.

In the given exemplary embodiment, an entry in the memory 1 includes the entry identifier ESB with a width of 2 bits. The identifier ESB indicates whether a memory entry represents a time event consisting of a time value TCV and signal statuses TRIG, or a time shift value is stored in this entry. When the identifier ESB indicates that a time shift value is stored in the entry being addressed, then the output bits TCV are not processed as a time value, but rather the value contained there is deposited in the time shift register. With the aid of the identifier ESB, it is thus possible to distinguish between memory entries as a time event (as in FIG. 2a) and memory entries for setting the time shift register. It is thus possible to prescribe different time shift values for a large number of time events in the course of one count cycle by purposefully programming the memory 1 accordingly.

Each entry in the memory 1—both time event entries and time shift entries—has a 4-bit-wide group code GEB (Group Enable Bit) and a 2-bit-wide frame code FEB (Frame Enable Bit), which can be tapped at corresponding output terminals of the memory 1. The group code GEB is delivered to a group enable device 9, and the frame code FEB is delivered to a frame enable device 8. The group enable device 9 compares the group code GEB to a group enable register and generates a group enable signal GE (Group Enable) from the comparison result, which signal is fed to the gating device 10. Likewise, the frame enable device 8 generates a frame enable signal FE (Frame Enable) from the frame code FEB from the contents of a frame enable register and from a frame clock signal FCT (Frame Count). This frame enable signal FE is delivered to the gating device 10.

FIG. 3 shows the basic functioning of the group enable device 9. The group enable device 9 includes a decoder 11 for decoding the group code GEB and a group enable register 12. The group enable register 12 is programmed by the control device 6 using a signal SGER (Set Group Enable Register). The group enable register 12 includes a width of 16 bits, as represented in FIG. 3. This corresponds to the number of available group codes that are coded with 4 bits in memory 1. The decoder 11 decodes the group code GEB of a memory entry and thus points to a specific bit in the group enable register 12. The value of this bit is outputted to the gating device 10 as group enable signal GE. Depending on the value of the bit that has been selected, the memory entry is gated out of processing or is executed.

FIG. 4 shows an exemplary embodiment of the frame enable logic 8. The frame enable logic 8 includes a counter 13, which cycles with the frame cycle FCT. The frame cycle FCT corresponds to the reset signal of the TDMA counter 5 in the comparison unit 2. The counter 13 is a mod26 counter; that is, the counter is reset after 26 pulses. The counter can be set to an initial value via a signal SFCT. The frame enable logic includes a frame enable register 14, which can be programmed by the control device 6 via the line SFER (Set Frame Enable Register). The frame enable register 14 has a width of 26 bits. The value 26 has been selected for the counter 13 and the frame enable register 14 because, under the specifications of the GSM standard, specific frames must repeat with every 26$^{th}$ frame. A frame cycle with a length of 26 frames thus emerges. The instantaneous value of the counter 13 points to a specific bit in the frame enable register 14. The contents of this bit are linked to the frame code FEB in an enable logic 15 in order to form the frame enable signal FE therefrom. In this way it is possible to program particular frames in the GSM frame cycle with different time indications than other frames.

The gating device 10 conducts the signal statuses TRIG to the output as output signal statuses TRIGOUT via an output buffer memory. The output buffer memory is actuated by the comparison unit 2 via the signal OL (Output Latch). However, the output buffer memory in the gating device 10 is not actuated when a corresponding group enable signal GE or a corresponding frame enable signal FE is present. Similarly, the gating device 10 of the comparison unit 2 signals the comparison unit 2 via a signal SKIP that the comparison unit should request the next memory entry.

The timing device according to the invention can ready, or load, all timing signals that periodically recur in a TDMA frame and thus relieves the control device 6 of the burden of continuously generating time events. These timing signals are either signals within a module (e.g. trigger signals for an equalizer or for triggering frequency telegrams for a high-frequency control device) or external signals for controlling a high-frequency unit. With the aid of a user-programmable event table, each timing signal can be programmed in a highly flexible fashion. Moreover, they are outputted synchronously.

The memory 1 of the timing device contains the information about the time within a TDMA frame at which one or more of a plurality of output signals TRIG should change their status, as well as the new signal statuses of all output signals at this time. A time value and the appertaining output signals TRIG together represent time events. The memory 1 is addressed cyclically. The comparator or comparison logic 4 compares the last time value of the memory 1 to the count of the counter 5. When the values match, the values TRIG that are read from the memory 1 are outputted as output signals TRIGOUT. Subsequent to this match, the memory address is incremented by the address generator 7, and the next time value is compared to the count of the counter 5.

The memory 1 includes time event entries and time shift entries. Within a clock cycle of the TDMA counter 5, which has a frequency of 2.166 MHz, the control device 6 can execute up to six accesses of the memory 1 in order to program it, without disrupting the output of the time events. This applies analogously to the time shift register, the frame enable register 14, and the group enable register 12.

When a new time shift value is read from the memory 1, this value is written into the time shift register of the time shift unit 3. The comparison unit 2 then prompts the address generator 7 via the line MT (Match Timer) to address the next entry in the memory 1. When the entry that is read from the memory 1 triggers a corresponding frame enable signal FE and/or group enable signal GE based on its frame code FEB and/or group code GEB, then this entry is skipped (signaled by SKIP), and the address generator 7 is prompted to address the next entry in the memory 1.

With the group code GEB, it is possible to allocate to one group all time indications that are required in order to process a transmission burst. In the same way, time indications with which reception and monitoring bursts are processed or at which battery measurements are executed can be combined and enabled or blocked jointly.

We claim:

1. A timing device for generating and outputting a plurality of signal edges by changing signal statuses at predetermined times, comprising:
    a cyclically addressed memory for storing a plurality of time events, each of the plurality of time events assigned a time value that corresponds corresponding to a predetermined time and assigned a plurality of predetermined signal statuses;
    a comparator configured for comparing an instantaneous count of a counter to a current time value of a current one of the plurality of time events that has currently been read from said memory, said comparator configured such that if the instantaneous count matches the current time value, then said comparator reads a subsequent time event from said memory;
    a time shift device connected in series with said comparator, said time shift device configured to add a time shift value to the current time value of the current one of the plurality of time events that has currently been read from said memory, said time shift device configured to feed a result of the addition to said comparator; and
    an output device for outputting the plurality of predetermined signal statuses.

2. The timing device according to claim 1, wherein the time shift value is stored in said memory as a time event that is provided with a special coding and wherein said time shift device includes a register into which the time shift value is loaded upon being read out from said memory.

3. The timing device according to claim 1, comprising a register into which the time shift value is stored, and said register being controlled by control device.

4. The timing device according to claim 1, wherein each of said plurality of time events is assigned a group code selected from a plurality of group codes.

5. The timing device according to claim 4, comprising a group enable device having a group enable register, said group enable device configured to emit a group enable signal when one of the plurality of time events that has a specific one of the plurality of group codes must be blocked in accordance with an entry in the group enable register.

6. The timing device according to claim 5, wherein said group enable register is controlled by a control device.

7. The timing device according to claim 1, wherein each of the plurality of time events is assigned a frame code selected from a plurality of frame codes.

8. The timing device according to claim 7, comprising a frame enable device having a frame counter, a frame enable register, and frame enable logic; said frame counter having a count that points to a specific entry in said frame enable register; the specific entry being processed in said frame enable logic with a frame code assigned to a current one of the plurality of time events in order to generate a frame enable signal.

9. The timing device according to claim 8, wherein said frame enable register is controlled by a control device.

10. A method for generating a plurality of signal edges at specific times which comprises;
    storing a plurality of time events in a memory in a predetermined order, the plurality of time events having a plurality of time values and a plurality of signal statuses;
    reading one of the plurality of time events from the memory;
    adding a time shift value to a time value of the one of the plurality of time events that has just been read from the memory;

comparing a time value contained in the read one of the plurality of time events to a present count of a counter;

reading a next one of the plurality of time events, if the time value that has just been read out matches the present count of the counter;

outputting the plurality of signal statuses of a time event.

11. Utilization of the timing device according to claim 1 in a component of a mobile radio system based on TDMA, the component selected from the group consisting of a mobile station and a base station.

* * * * *